Aug. 7, 1962  E. W. SHEWELL  3,048,245
LOCKING MECHANISM
Filed Feb. 29, 1960  2 Sheets-Sheet 1

Inventor:
Earl W. Shewell
Attorney

Inventor:
Earl W. Shewell
by:
Attorney

United States Patent Office 3,048,245
Patented Aug. 7, 1962

3,048,245
LOCKING MECHANISM
Earl W. Shewell, Hamilton, Ontario, Canada, assignor to Arean Eastern Limited, Hamilton, Ontario, Canada, a company of Ontario
Filed Feb. 29, 1960, Ser. No. 11,600
3 Claims. (Cl. 189—36)

This invention relates to a locking mechanism. It is particularly directed to a new and useful locking mechanism which can be used to rigidly but detachably secure together the structural component parts which are used in pallet rack, shelf rack, scaffolding and the like constructions.

Securing and joining means are well known and are widely used in the art to which this invention relates. For example, conventional pallet racks, which are normally fabricated from channel and angle steel, are usually secured into rigid integral units by means of a plurality of bolts and screws and the like fastening means, or by interlocking joints which utilize additional connecting devices by means of which a structure can be assembled and dismantled as desired.

Structures used as racks, shelving, scaffolding and the like normally comprise upright truss post assemblies, horizontal beam support members and the connecting means hereinbefore mentioned. The post assemblies usually are fabricated from two vertical columns rigidly secured a spaced distance apart by horizontal and diagonal channels normally welded or otherwise secured thereto. The post assemblies provide rigidity in the vertical plane transverse to the long axis of the structure. At the installation site, the horizontal beams are secured to the upright post assemblies by connecting means and ancillary members such as cross-braces or locking devices are installed to provide rigidity in the longitudinal plane of the structure. Locking devices such as removable pins, for example, are employed to anchor horizontal support members to the vertical columns and to provide rigidity in the longitudinal plane of the structure.

These conventional constructions heretofore employed necessitate the use of bolts or other fastening devices which require the maintenance of a costly inventory of parts and hand tools and also usually require the employment of at least semi-skilled workmen. Also, the use of supplementary third members, such as locking devices or cross-bracing to provide rigidity in the longitudinal plane of the structure, presents installation problems. The multiplicity of parts required, and/or the installation time required to properly erect a rigid and self-supporting structure, often increase capital and erection costs to a prohibitive level. High costs, or, the difficulty of modifying the structure to meet changing needs of the user, therefore often preclude ready acceptance of available structures.

One of the principal objects of the present invention is to provide locking mechanisms for structural parts which provide quick and ready assembly and which provide positive and rigid joints in their assembled positions.

Another important object of the present invention is the provision of simple locking mechanisms which can be readily and inexpensively manufactured.

A further important object of the present invention is to employ these locking mechanisms with pallet rack, shelf rack and scaffold and the like constructions which can be assembled, dismantled or adjusted quickly and readily, and which do not require the use of conventional fastening means such as screws and bolts and the like.

A still further object of the present invention is to provide constructions which are rigid and self-supporting in their assembled positions and which obviate the necessity of a multiplicity of cross braces and supporting members and/or ancillary interlocking members.

An understanding of the manner in which these and other objects of the present invention can be attained may be had from the following description, reference being made to the accompanying drawings, in which.

Like reference characters refer to like parts throughout the description of the drawings.

Figure 1:
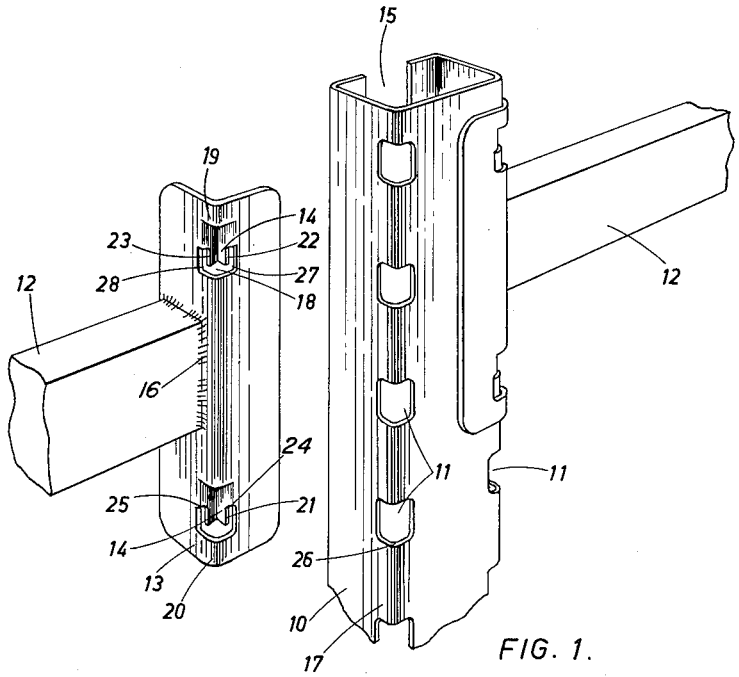
FIGURE 1 is a perspective view of a preferred embodiment of the invention in which the locking means are illustrated by which a horizontal support or shelf member and a vertical post member are rigidly secured together.

A preferred embodiment of my invention, as illustrated by FIGURE 1, comprises in general a vertical post or column member 10 with spaced cut-out portions or slots 11 formed therein, a horizontal member 12 with an end plate 13 rigidly secured thereto, and a pair of inverted locking projections 14 formed in said end plate 13.

The vertical post member 10 is of hollow, rectangular shape, as shown, to provide rigidity and to permit ready attachment thereto of reinforcing channels. A plurality of slots 11, spaced equidistant a predetermined distance along the longitudinal axis of the column member 10, are formed in the two outside corners of said column on the side opposed to longitudinal slot 15.

End plate 13 is rigidly secured to each end of each horizontal support member 12 at right angles thereto, as shown, by fillet welding 16 or like means. Said end plate 13 is bent to conform with the outside corner 17 of column member 10 and to provide a close-fitting joint therewith. Downwardly extending projections 14 are formed in one side of end plate 13 by forming cutouts 18 and 19 in corners 20 of said plate and inwardly deforming section 21 therebetween such that said inwardly disposed projections 14 contain an included angle of about 90°. Projections 14 are spaced a predetermined distance apart substantially equal to a multiple of the longitudinal spacings of slots 11.

In the embodiment illustrated, a pair of projections 14 are co-extensive with three slots 11. The spacing of projections 14 is determined by the rigidity and vertical load and torsional load requirements of the horizontal support members. The multiple spacing of slots 11 is determined by the structural strength of column 10 together with the degree of vertical adjustment of the horizontal members desired.

In assembling a construction, an end plate 13 is brought adjacent to column 10 and the inverted, inwardly-disposed projections 14 are introduced into slots or cutouts 11. The end plate is lowered permitting the two outwardly facing bearing surfaces 22 and 23 of projection 14 to engage with the inside surfaces of column 10 and top bearing surfaces 24 and 25 of cut-out 18 to engage with the lower bearing surface 26 of slot 11. The two bearing surfaces 22 and 23 are disposed at right angles to the opposed inside walls 27 and 28 of end plate 13 and, in co-operation therewith, form a connection with the walls of column 10 which provides rigidity in both transverse and longitudinal planes. It is usually preferred to dispose bearing surfaces 22 and 23 of locking projection 14 in a predetermined space relation with walls 27 and 28 such that a tight joint is made with the walls of column 10. The engagement of top bearing surfaces 24 and 25 with bearing surface 26 provides vertical support for horizontal member 12.

The pair of spaced locking projections 14, illustrated in detail in FIGURE 1, interact to provide an effective counter to vertical and torsional deflection of horizontal member 12 due to turning moments resulting from improperly aligned or unbalanced loads on said horizontal member. Also, the pair of spaced locking projections provide added rigidity in the vertical longitudinal plane of the structure.

Figure 2:
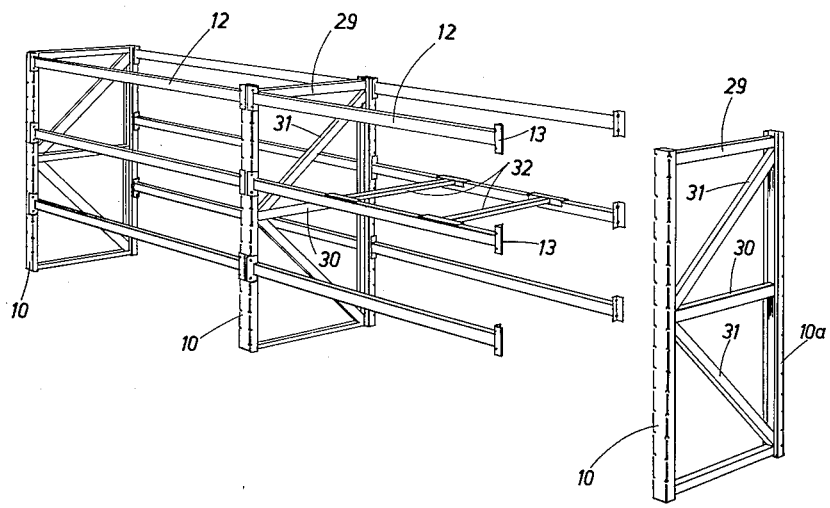
FIGURE 2 is a perspective view of an embodiment of a truss post assembly and a complete rack construction which are secured into a rigid structure by the locking means illustrated in detail in FIGURE 1.

FIGURE 2 illustrates an embodiment of an upright truss post construction 29 employed with the locking means hereinabove described to permit erection of the rack construction. The truss post construction comprises two vertical column members 10 and horizontal and diagonal channels 30 and 31 which are rigidly secured a spaced distance apart by welding or the like means. This truss construction provides rigidity in the transverse plane taken at right angles to the long axis of the structure.

The use of horizontal transverse members 32 may be desired for bulk storage. Said transverse members 32 are preferably slidably mounted on longitudinal members 12 and can be readily adjusted for changing load requirements.

Figure 3:
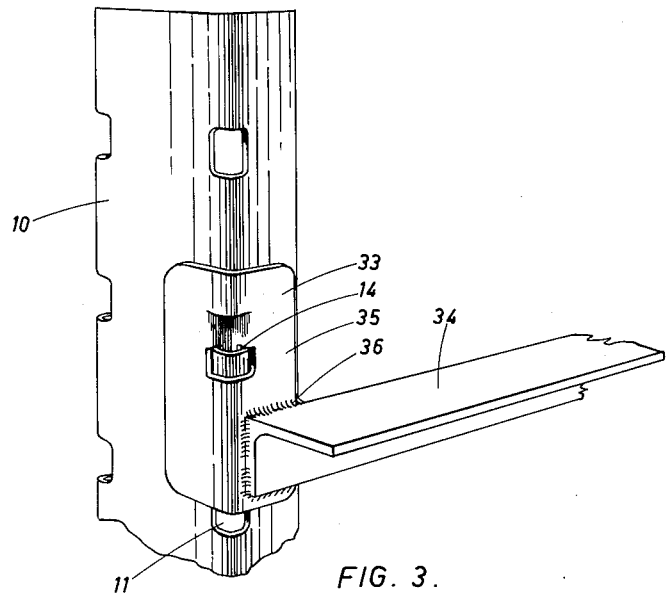
FIGURE 3 is a perspective view of an embodiment of the joining mechanism in which a single locking projection is employed.

It is sometimes preferred to assemble rack structures such that drive-in loading is possible. FIGURE 3 illustrates a joining mechanism 33 in which a single locking projection 14 is adapted to engage with a slot 11 in column 10. An angle steel member 34 is rigidly secured to a face of joining plate 35 as shown, by fillet welding 36 or by like securing means.

Figure 4:
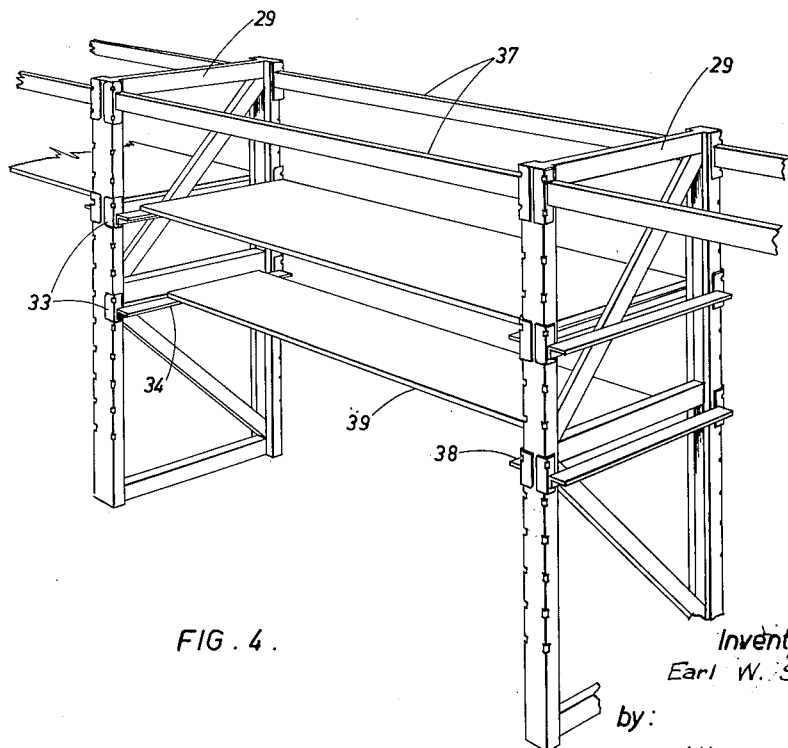
FIGURE 4 is a perspective view of an embodiment of a rack construction using the locking mechanism illustrated in FIGURE 3 which permits drive-in loading of the racks with pallets or trays.

FIGURE 4 illustrates a completed rack assembly employing this latter embodiment. Truss post assemblies 29 are rigidly held a fixed distance apart by horizontal beams 37 which are secured thereto by means as has been hereinbefore described in detail. The beams 37 are positioned at the topmost extremities of the post assemblies to permit ample clearance for the movement of a loading vehicle therebelow. Joining mechanisms 33 are secured to truss post 10 in the manner which has also been hereinbefore described in detail, and angle steel member 34, which is rigidly secured thereto, extends horizontally therebetween in a direction transverse to the supporting beams 37.

In a similar manner, angle steel member 38 is secured to the posts of the second truss post assembly in the same horizontal plane as angle steel 34.

Truss post assemblies 29 are spaced a predetermined distance apart such that trays or pallets 39 can be mounted on said angle steel members 34 and 38. A plurality of pairs of angle steel members can be mounted on said posts, the vertical proximity of these members being determined by the height of the articles stored.

The drive-in rack assemblies can be assembled in back-to-back and side-to-side relationship, thus creating a plurality of loading passageways. This is a preferred arrangement for bulk stock piling of bottles and the like.

To supplement the vertical load capacity or rigidity of the locking mechanisms, it is sometimes preferred to lengthen the end plates 13 or 35 of the two embodiments shown by FIGURES 1 and 3 and to add thereto an additional locking projection.

The present invention possesses a number of important advantages. The locking joint embodiments are easily assembled and, when assembled provide sufficient transverse and longitudinal rigidity to pallet rack and shelf rack assemblies and like structures to obviate the many cross members and braces normally found to be necessary. The joining mechanisms permit quick and ready assembly and dismantling of portions or the whole of the structures. The use of joining means such as screws, bolts and ancillary locking devices and the like is obviated, thereby facilitating ease and quickness of installation and, also, reducing fabricating tool requirements and equipment costs. The vertical post and horizontal support members can be readily manufactured from conventional metal products by conventional equipment.

It will be understood of course, that modifications can be made in the preferred embodiment of the invention described and illustrated herein without departing from the scope of the invention as defined by the appended claims.

What we claim as new and desire to protect by Letters Patent of the United States is:

1. An interconnecting, disengageable structure which comprises a vertical, rectangular shaped hollow post member and a horizontal load supporting member, slots formed at intervals along at least one corner of said vertical post member, means for detachably securing said load supporting member to said post member which comprises a plate of the shape of the corner structure of the vertical hollow post member, said plate being secured to an end of said load supporting member, said plate being L-shaped forming two wings and having one wing portion thereof secured to said load supporting member at the end portion of said load supporting member and at right angles thereto, the other wing portion of the L-shaped plate member being in a plane parallel to that of the load supporting member, downwardly extending projections struck inwardly from the material of the plate at the center thereof where the two wings of the L-shaped plate meet, said projections being of the shape to enter the slots formed in the vertical rectangular post member.

2. The structure according to claim 1, wherein the downwardly extending projections formed inwardly of the material of the plate have their lower portions formed with walls at right angles to each other.

3. The structure according to claim 2, wherein the outer edges of the walls formed on the projections are inward of the outer surface of the plate.

References Cited in the file of this patent

UNITED STATES PATENTS

| | | |
|---|---|---|
| 1,917,917 | Bales | July 11, 1933 |
| 2,815,130 | Franks | Dec. 3, 1957 |
| 2,925,920 | Skubic | Feb. 23, 1960 |
| 2,932,368 | Schell | Apr. 12, 1960 |
| 2,984,363 | Lang | May 16, 1961 |

FOREIGN PATENTS

| | | |
|---|---|---|
| 516,708 | Canada | Sept. 20, 1955 |

UNITED STATES PATENT OFFICE
CERTIFICATE OF CORRECTION

Patent No. 3,048,245                                August 7, 1962

Earl W. Shewell

It is hereby certified that error appears in the above numbered patent requiring correction and that the said Letters Patent should read as corrected below.

In the grant, lines 2 and 12, and in the heading to the printed specification, line 4, for "Arean Eastern Limited" read -- Arcan Eastern Limited --.

Signed and sealed this 29th day of January 1963.

(SEAL)
Attest:

ERNEST W. SWIDER                              DAVID L. LADD
Attesting Officer                                  Commissioner of Patents